US010525945B2

(12) United States Patent
Ayichew et al.

(10) Patent No.: US 10,525,945 B2
(45) Date of Patent: Jan. 7, 2020

(54) ANTISKID BRAKE CONTROL SYSTEM WITH AXLE-MOUNTED INERTIAL SENSOR

(71) Applicant: Goodrich Corporation, Charlotte, NC (US)

(72) Inventors: Efrem E Ayichew, Troy, OH (US); Michael Kordik, Dayton, OH (US); Marc Georgin, Dayton, OH (US); Paul L Summers, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 90 days.

(21) Appl. No.: 15/490,577

(22) Filed: Apr. 18, 2017

(65) Prior Publication Data
US 2018/0297564 A1   Oct. 18, 2018

(51) Int. Cl.
| B60T 8/00 | (2006.01) |
| B60T 8/17 | (2006.01) |
| B60T 8/172 | (2006.01) |
| B60T 8/1761 | (2006.01) |
| B64C 25/46 | (2006.01) |

(52) U.S. Cl.
CPC ............ B60T 8/1703 (2013.01); B60T 8/172 (2013.01); B60T 8/1761 (2013.01); B64C 25/46 (2013.01)

(58) Field of Classification Search
None
See application file for complete search history.

(56) References Cited

U.S. PATENT DOCUMENTS

| 3,953,082 A * | 4/1976 | Smith ................. B60T 8/74 |
| | | 303/116.3 |
| 7,451,032 B2 | 11/2008 | Brown et al. |
| 8,666,589 B2 | 3/2014 | Munnix |
| 2001/0032045 A1* | 10/2001 | Hano .................. B60T 8/172 |
| | | 701/80 |
| 2005/0240321 A1* | 10/2005 | Darke ................ B60T 8/1703 |
| | | 701/3 |
| 2007/0131030 A1* | 6/2007 | Jeong ............... G01C 19/5747 |
| | | 73/504.12 |
| 2007/0203633 A1* | 8/2007 | Johnsen .............. B64C 25/426 |
| | | 701/70 |
| 2010/0010770 A1* | 1/2010 | Helck ................. B60C 23/061 |
| | | 702/141 |

(Continued)

FOREIGN PATENT DOCUMENTS

| CN | 101915673 | 12/2012 |
| CN | 103803098 | 5/2014 |

(Continued)

OTHER PUBLICATIONS

US 2001/0003204 A1, 10/2001, Hano et al. (withdrawn)

(Continued)

*Primary Examiner* — Truc M Do
(74) *Attorney, Agent, or Firm* — Snell & Wilmer, L.L.P.

(57) ABSTRACT

A brake control system may comprise an inertial sensor coupled to an axle and configured to measure a linear acceleration of the axle and an antiskid control (ASK) in electronic communication with the inertial sensor, wherein at least one of the inertial sensor or the ASK calculate a linear velocity of the axle based on the linear acceleration, and the ASK uses the linear velocity to calculate a wheel slip speed.

18 Claims, 7 Drawing Sheets

(56) References Cited

U.S. PATENT DOCUMENTS

| | | | | |
|---|---|---|---|---|
| 2010/0063703 A1* | 3/2010 | Clothier | ............... | B60T 8/1703 |
| | | | | 701/90 |
| 2014/0012437 A1* | 1/2014 | Jones | ................... | B60T 8/1703 |
| | | | | 701/15 |
| 2015/0232075 A1* | 8/2015 | Fosdike | ............... | B60T 8/1708 |
| | | | | 701/70 |
| 2015/0254990 A1* | 9/2015 | Raby | .................... | B64C 25/426 |
| | | | | 701/16 |
| 2015/0375719 A1 | 12/2015 | Zhang et al. | | |
| 2016/0202147 A1* | 7/2016 | Svantesson | ........... | G01M 17/02 |
| | | | | 702/189 |
| 2016/0368384 A1* | 12/2016 | Johansson | ............... | B60L 3/102 |
| 2017/0089287 A1* | 3/2017 | Kovac | ................. | F02D 41/0097 |

FOREIGN PATENT DOCUMENTS

| | | |
|---|---|---|
| DE | 102006020471 | 11/2007 |
| DE | 102009020428 | 5/2010 |
| EP | 2821302 | 1/2015 |

OTHER PUBLICATIONS

European Patent Office, European Search Report dated Dec. 21, 2018 in Application No. 18168002.6.

European Patent Office, European Search Report dated Sep. 18, 2018 in Application No. 18168002.6-1012.

\* cited by examiner

ANTISKID BRAKE CONTROL SYSTEM WITH AXLE-MOUNTED INERTIAL SENSOR

FIELD

The present disclosure relates generally to the field of brake control systems, and more specifically to systems and methods for aircraft brake control.

BACKGROUND

Aircraft brake control systems typically employ a brake control unit (BCU). The BCU may receive brake commands from an antiskid controller as well as brake commands from a pilot. The BCU generally produces a pressure command which is usually the minimum of the pilot desired pressure and the antiskid desired pressure. This pressure command is generally sent to a pressure controller for controlling pressure being supplied to a brake of an aircraft wheel for braking.

SUMMARY

Systems and methods disclosed herein may be useful for providing braking to aircraft brakes. In this regard, a brake control system is disclosed herein in accordance with various embodiments. A brake control system may comprise an inertial sensor coupled to an axle and configured to measure a linear acceleration of the axle and an antiskid control (ASK) in electronic communication with the inertial sensor, wherein at least one of the inertial sensor or the ASK calculate a linear velocity of the axle based on the linear acceleration, and the ASK uses the linear velocity to calculate a wheel slip speed.

In various embodiments, the inertial sensor may measure the linear acceleration of the axle in a forward direction. The inertial sensor may comprise at least one of an accelerometer, a magnetometer, and a gyroscope. The inertial sensor may comprise a microelectromechanical system (MEMS). The brake control system may further comprise a wheel speed sensor configured to measure a rotational velocity of the axle. The rotational velocity and the linear velocity may be used to calculate the wheel slip speed. The ASK may calculate the wheel slip speed using equation $V_{slip}=V_{ac}-r_{drag}\cdot\omega$, where $V_{ac}$ equals the linear velocity, $\omega$ equals the rotational velocity, and $r_{drag}$ equals a distance between an axis of rotation of the axle and a ground surface. The ASK may comprise a controller and instructions stored in a memory configured to be executed by the controller, the ASK being mounted to the axle, the ASK configured to send the wheel slip speed to an airframe mounted controller via at least one of an analog signal or a digital signal. The ASK may comprise a controller and instructions stored in a memory configured to be executed by the controller, the ASK being mounted to an airframe, the inertial sensor configured to send at least one of a raw signal or a processed signal to the ASK via at least one of an analog signal or a digital signal. The brake control system may further comprise a load balance control (LBK). The inertial sensor may be configured to measure an additional linear acceleration of the axle, the additional linear acceleration measured in a vertical direction. The LBK may calculate a load balance deceleration command using the additional linear acceleration.

A method for controlling brakes is disclosed herein, in accordance with various embodiments. A method for controlling brakes may comprise measuring, by an inertial sensor, a linear acceleration of an aircraft, receiving, by an antiskid control (ASK), the linear acceleration, calculating, by the ASK, a wheel slip speed based on the linear acceleration, and calculating, by the ASK, a pressure command based on the wheel slip speed.

In various embodiments, the method may further comprise calculating, by the ASK, an aircraft speed based on the linear acceleration, wherein the ASK calculates the wheel slip speed using the aircraft speed. The method may further comprise receiving, by a brake control unit (BCU), the pressure command from the ASK, and sending, by the BCU, a current to a brake control device. The aircraft speed may be measured in a forward direction.

A method for controlling brakes is disclosed herein, in accordance with various embodiments. A method for controlling brakes may comprise measuring, by an inertial sensor, a linear acceleration of an aircraft, receiving, by a load balance control (LBK), the linear acceleration, and calculating, by the LBK, at least one of a load balance deceleration command and a desired pressure adjustor using the linear acceleration.

In various embodiments, the method may further comprise receiving, by an antiskid control (ASK), the load balance deceleration command. The method may further comprise receiving, by a brake control unit (BCU), a pressure command from the ASK, the pressure command generated using the load balance deceleration command, and sending, by the BCU, a current to a brake control device. The linear acceleration may be measured in a vertical direction.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the context of the present disclosure, systems and methods may find particular use in connection with aircraft wheel and brake control systems. However, various aspects of the disclosed embodiments may be adapted for optimized performance with a variety of components and in a variety of systems. As such, numerous applications of the present disclosure may be realized.

In general, the tire, wheel, brake rotors and axle rotate together. The opposite of a skid event is the condition where the tire, wheel, etc., rotate freely at a speed equivalent to the translational axle speed. This equivalent speed without any deceleration may be referred to as the synchronous wheel speed. As brakes are applied, torque is generated, which slows the rotational speed of the wheel. This may cause the wheel to rotate at a speed slower than the synchronous speed. This difference between synchronous speed and equivalent braked speed represents the wheel slip velocity. As the slip velocity or difference increases, the tire drag force created at the tire/runway interface increases, causing the aircraft to decelerate. This drag force increases until slip velocity reaches a value dependent on tire/runway conditions. As slip velocity increases beyond this value, drag force decreases. Thus, the goal of efficient antiskid control is to maintain operation near this slip velocity corresponding to the maximum drag force.

Figure 1:
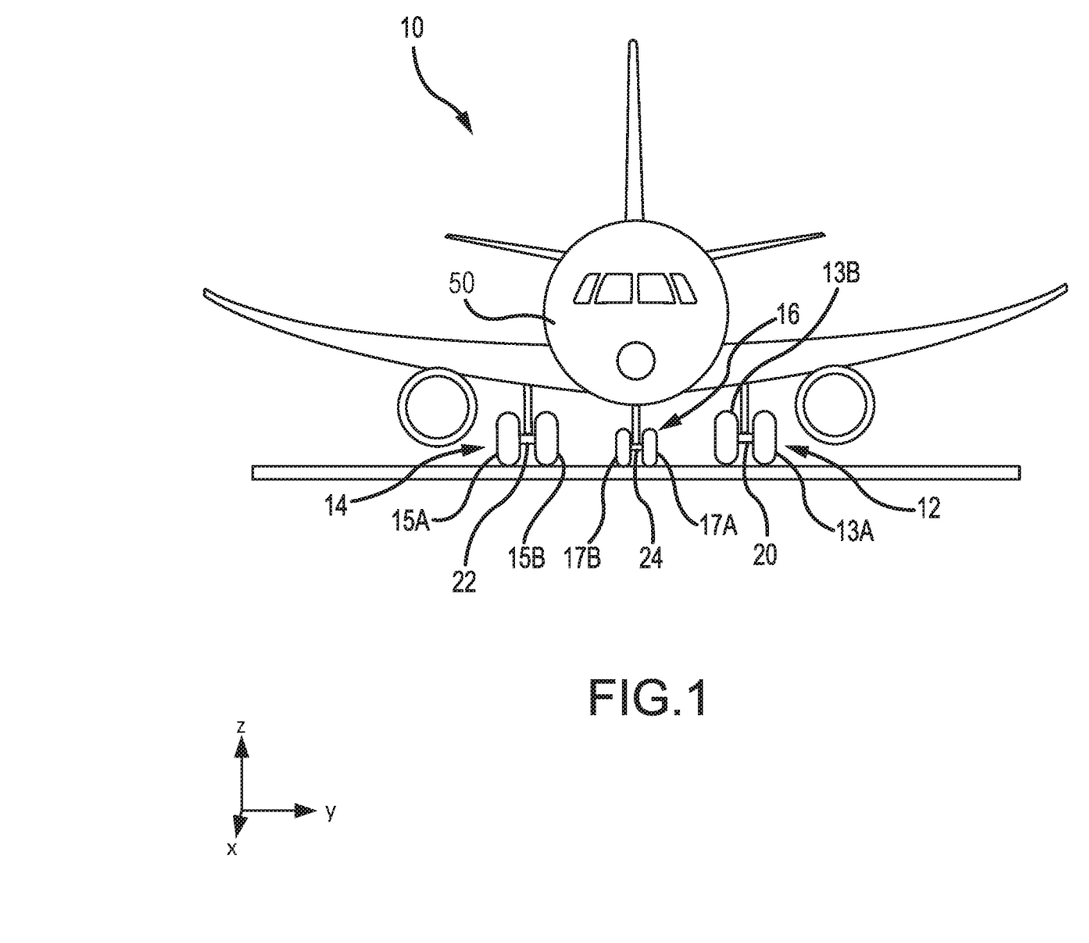
FIG. 1 illustrates a perspective view of an aircraft, in accordance with various embodiments.

With reference to FIG. 1, an aircraft 10 in accordance with various embodiments may include landing gear such as landing gear 12, landing gear 14 and landing gear 16. Landing gear 12, landing gear 14 and landing gear 16 may generally support aircraft 10 when aircraft is not flying, allowing aircraft 10 to taxi, take off and land without damage. Landing gear 12 may include wheel 13A and wheel 13B coupled by an axle 20. Landing gear 14 may include wheel 15A and wheel 15B coupled by an axle 22. Landing gear 16 may include nose wheel 17A and nose wheel 17B coupled by an axle 24. The nose wheels differ from the main wheels in that the nose wheels may not include a brake and/or a wheel speed transducer. An XYZ axes is used throughout the drawings to illustrate the axial (y), forward (x) and vertical (z) directions relative to axle 22. Aircraft 10 may comprise an airframe 50.

Figure 2:
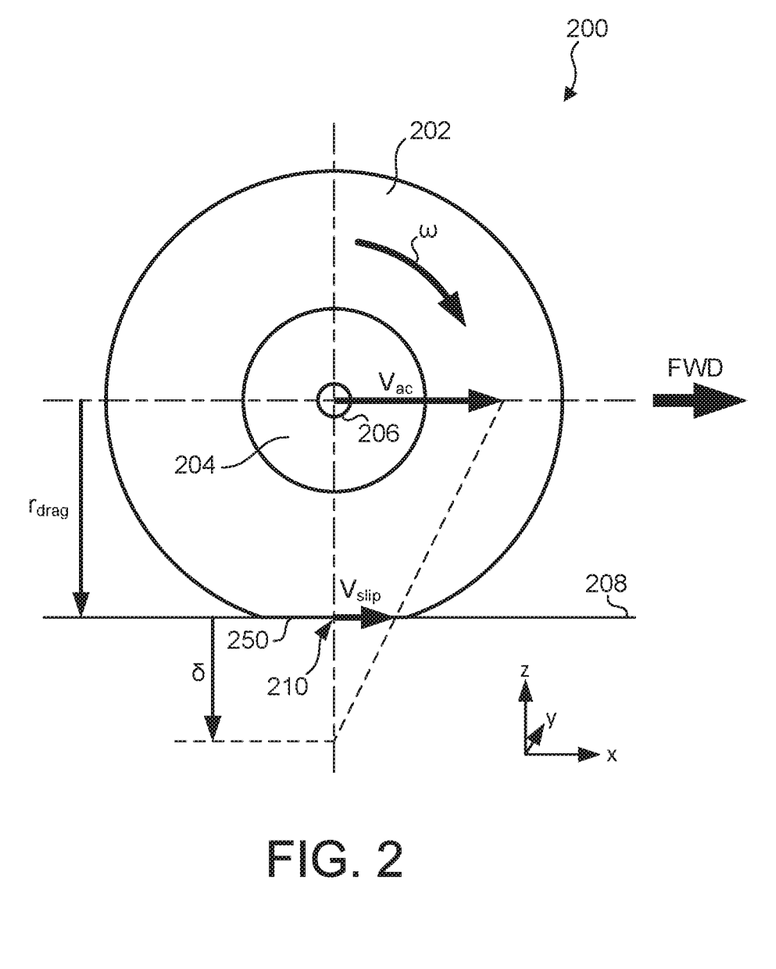
FIG. 2 illustrates a schematic view of a wheel/axle arrangement rolling on a ground surface under load, in accordance with various embodiments.

With reference to FIG. 2, a wheel/axle arrangement 200 is illustrated, in accordance with various embodiments. Wheel/axle arrangement 200 may comprise a tire 202, a wheel 204, and an axle 206. In various embodiments, wheel 15A and axle 22 of FIG. 1 may be similar to wheel 204 and axle 206 of FIG. 2. Tire 202 may be mounted to wheel 204. Wheel 204 may be mounted to axle 206. On the ground, tire 202 may deform such that a surface 250 is in contact with the ground surface 208. Axle 206, wheel 204, and tire 202 may rotate together. During a braking maneuver, wheel/axle arrangement 200 may rotate at a rotational speed ω. Rotational speed ω may be specified as revolutions per minute (rpm) or radians per second (rad/s) of wheel/axle arrangement 200. Wheel/axle arrangement 200 may comprise an aircraft speed $V_{ac}$. Aircraft speed $V_{ac}$ may be specified as the linear speed (in feet per second (fps), miles per hour (mph), knots (kt), etc.) of wheel/axle arrangement 200 in the forward direction (i.e., the positive x-direction). Wheel/axle arrangement 200 may comprise a wheel slip speed $V_{slip}$. Wheel slip speed $V_{slip}$ may be specified as the linear speed at which the contact surface 210 of tire 202 is slipping against the ground surface 208. Wheel/axle arrangement 200 may comprise a drag radius $r_{drag}$. Drag radius $r_{drag}$ may be the distance between the axis of rotation of wheel/axle arrangement 200 and the ground surface 208. Wheel/axle arrangement 200 may comprise a slip radius δ. Slip radius δ may be a function of drag radius $r_{drag}$, wheel slip speed $V_{slip}$, and aircraft speed $V_{ac}$.

In various embodiments, slip may be defined as the ratio of the wheel slip speed $V_{slip}$ and the aircraft speed $V_{ac}$ and may be calculated using equation 1 below.

$$\text{slip} = \frac{V_{slip}}{V_{ac}} = \frac{\delta\omega}{V_{ac}} = \frac{v_{ac} - r_{drag} \cdot \omega}{V_{ac}} \qquad \text{EQ. 1}$$

In this regard, wheel slip speed $V_{slip}$ may be calculated using equation 2 below.

$$V_{slip} = V_{ac} - r_{drag} \cdot \omega \qquad \text{EQ. 2}$$

Typically, a wheel speed sensor is used to determine the rotational speed ω which is used to estimate the aircraft speed $V_{ac}$ and ultimately estimate wheel slip speed $V_{slip}$. However, there are limitations in the calculations used to estimate the aircraft speed $V_{ac}$ using the rotational speed ω which may lead to errors in estimating wheel slip speed $V_{slip}$. Therefore, the present application provides, in addition to the wheel speed sensor, an inertial sensor for directly measuring the aircraft speed $V_{ac}$, which may tend to reduce these errors and allow for more accurate calculations of the wheel slip speed $V_{slip}$. In this regard, slip is calculated directly using the measured aircraft speed $V_{ac}$ from the inertial sensor. As described herein, aircraft speed $V_{ac}$ may be determined by measuring the speed of a wheel assembly component of the aircraft, such as an axle, for example.

Figure 3:
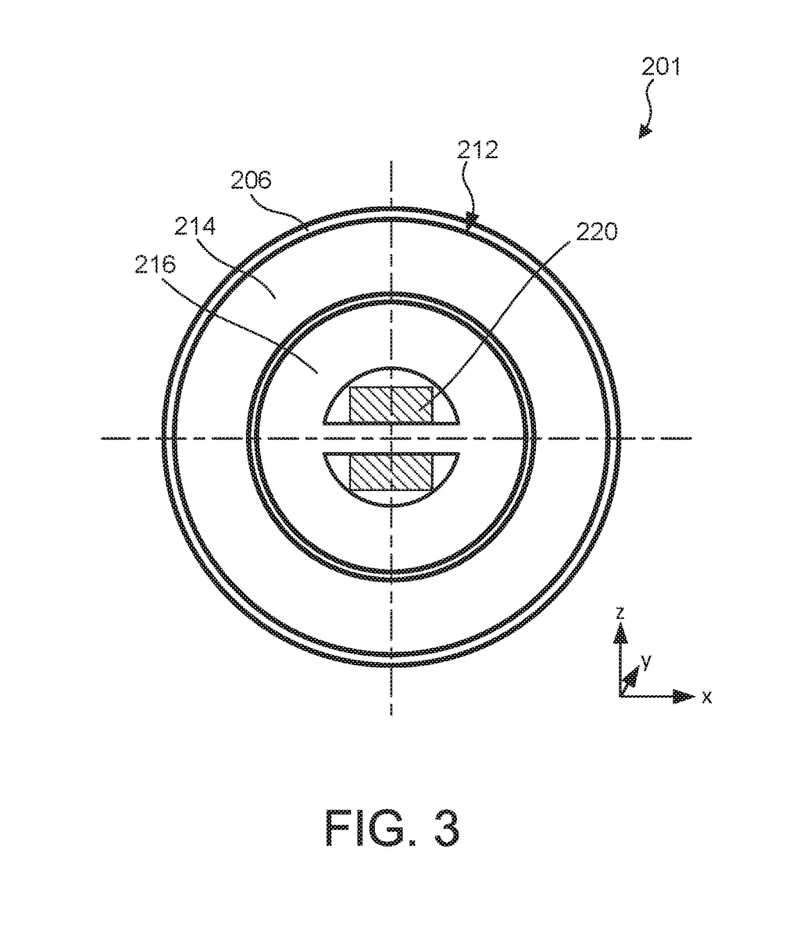
FIG. 3 illustrates a schematic view of an inertial sensor coupled to an axle, in accordance with various embodiments.

With reference to FIG. 3, an axle arrangement 201 is illustrated, in accordance with various embodiments. Axle arrangement 201 includes axle 206. Axle 206 may include a wheel speed sensor 212, and an inertial sensor 220. In various embodiments, wheel speed sensor 212 comprises a wheel speed sensor stator 214 and a wheel speed sensor rotor 216. Wheel speed sensor stator 214 may rotate relative to wheel speed sensor rotor 216. Wheel speed sensor 212 may measure the rotational velocity of a wheel (e.g., wheel 204 of FIG. 2). In various embodiments, inertial sensor 220 may be coupled to axle 206. Inertial sensor 220 may be configured to calculate and/or measure multi-axis speed, acceleration, and/or attitude of a structure, in accordance with various embodiments.

In various embodiments, inertial sensor 220 may comprise an accelerometer, a gyroscope, and/or a magnetometer. Inertial sensor 220 may measure acceleration of axle 206. Inertial sensor 220 may measure acceleration of axle 206 in the fore/aft direction (i.e., the X-direction). Inertial sensor 220 may measure acceleration of axle 206 in the vertical direction (i.e., the Z-direction). Inertial sensor 220 may measure acceleration of axle 206 in the longitudinal direction (i.e., the Y-direction). Inertial sensor 220 may measure an acceleration of axle 206 to determine a velocity of axle 206 using the measured acceleration. Thus, the velocity of axle 206, in various directions, may be determined by inertial sensor 220.

In various embodiments, inertial sensor 220 may comprise microelectromechanical systems (MEMS). In this regard, inertial sensor 220 may comprise a MEMS accelerometer.

Figure 4:
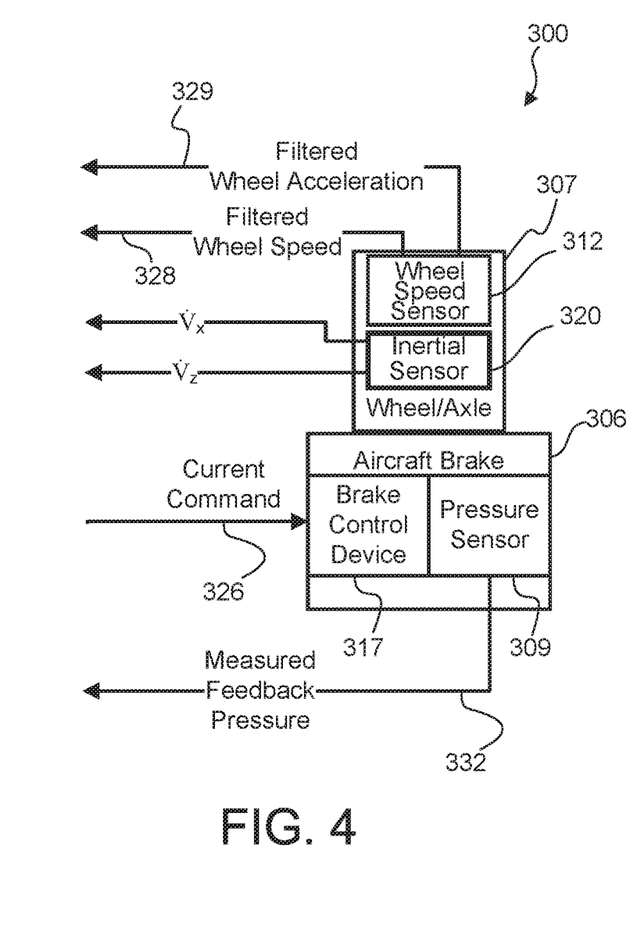
FIG. 4 illustrates a schematic view of a system for aircraft braking, in accordance with various embodiments.

With reference to FIG. 4, system 300 for aircraft braking may comprise an inertial sensor 320 for determining the linear speed of wheel/axle arrangement 307. Inertial sensor 320 may be similar to inertial sensor 220 of FIG. 3. The system 300 includes a brake 306, and a wheel/axle arrangement 307. In various embodiments, wheel/axle arrangement 307 may comprise a wheel mounted to an axle. The wheel may include a tire mounted to the wheel. Wheel/axle arrangement 307 may comprise a wheel speed sensor 312 and an inertial sensor 320. Wheel/axle arrangement 307 may be similar to wheel/axle arrangement 200, with momentary reference to FIG. 2. Wheel speed sensor 312 may measure a filtered wheel speed 328. Wheel speed sensor 312 may measure a filtered wheel acceleration 329.

In various embodiments, brake 306 may apply a stopping force in response to pressure applied by brake control device 317. Brake control device 317 may be an electronically controlled servo valve configured to actuate a hydraulic valve and thereby control the stopping force generated by brake 306. Brake control device 317 may receive an instruction to apply pressure to one or more friction disks of the brake 306. Brake control device 317 may receive current command (also referred to herein as a brake command) 326. In response, the brake control device 317 may open and/or close a hydraulic valve to varying degrees to adjust the pressure applied to brake 306, thus decelerating the wheel/axle arrangement 307 in a controlled manner. This pressure may be referred to as a braking pressure.

In various embodiments, brake control device 317 may also be an electromechanical brake actuator configured to actuate a puck against the brake stack in response to a current (e.g., current command 326) and/or voltage applied to the actuator. The force of the puck compressing the brake stack provides braking torque to stop wheel/axle arrangement 307.

In various embodiments, brake 306 may include a pressure sensor 309 for measuring the pressure applied by the brake control device 317. The pressure sensor 309 may transmit the measured pressure 332 to a pressure control (PK) for feedback control of brake control device 317. In embodiments using an electromechanical actuator for brake control device 317, pressure sensor 309 may comprise a force sensor in the form of a load cell output and/or a force estimation.

Inertial sensor 320 may measure a linear acceleration ($\dot{V}_x$) in the forward direction (i.e., the positive x-direction of FIG. 2). A controller (e.g., ASK/DK 452, LBK 560, LBK 660, and/or ASK 612) may calculate a linear velocity ($V_x$) in the forward direction, using linear acceleration ($\dot{V}_x$). Inertial sensor 320 may measure a linear acceleration ($\dot{V}_z$) in the vertical direction (i.e., the positive z-direction of FIG. 2). A controller (e.g., ASK/DK 452, LBK 560, LBK 660, and/or ASK 612) may calculate a linear velocity ($V_z$) in the vertical direction (i.e., the positive z-direction of FIG. 2). Thus, the linear acceleration is used to calculate the linear speed. Although described as being calculated by a controller such as ASK/DK 452, LBK 560, LBK 660, and/or ASK 612, it is contemplated herein that a separate controller may be provided to receive the acceleration from inertial sensor 320 to calculate velocity. In this regard, inertial sensor 220 may report the acceleration of axle 206 to ASK/DK 452, LBK 560, LBK 660, and/or ASK 612, as provided herein.

Figure 5:
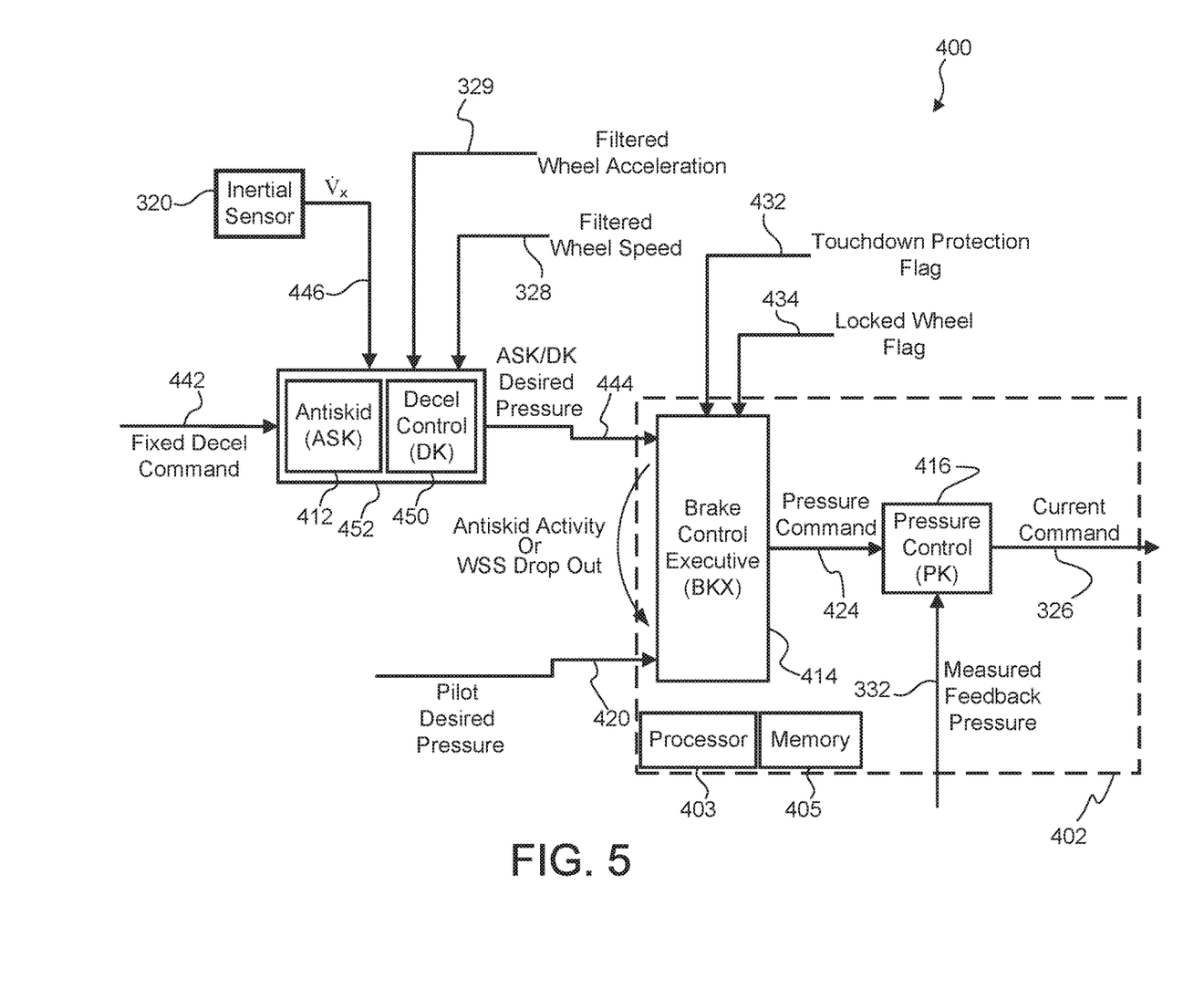
FIG. 5 illustrates a schematic view of a brake controls system having an inertial sensor in electronic communication with an antiskid control (ASK), in accordance with various embodiments.

With reference to FIG. 5, a system 400 for brake control is illustrated, in accordance with various embodiments. System 400 may include a brake control unit (BCU) 402, an ASK/deceleration control (ASK/DK) 452, comprising ASK 412 and DK 450. ASK 412 may serve to reduce the likelihood of the aircraft skidding. In various embodiments, ASK 412 may comprise instructions stored in memory 405. In various embodiments, DK 450 may comprise instructions stored in memory 405.

In various embodiments, the BCU 402 may include one or more processors 403 and one or more tangible, non-transitory memories 405 in communication with processor 403. Processors 403 are capable of implementing logic. The processor 403 can be a general purpose processor, a digital signal processor (DSP), an application specific integrated circuit (ASIC), a field programmable gate array (FPGA) or other programmable logic device, discrete gate or transistor logic, discrete hardware components, or a combination of processing logic.

In various embodiments, with momentary reference to FIG. 3 and FIG. 5, inertial sensor 320 may include a controller locally mounted to axle 206 with instructions stored therein configured to locally calculate linear acceleration ($\dot{V}_x$), linear velocity ($V_x$), linear acceleration ($\dot{V}_z$), and/or linear velocity ($V_z$). In various embodiments, ASK 412 may be locally mounted to axle 206. In this regard, ASK 412 may calculate wheel slip speed $V_{slip}$ locally. In this regard, inertial sensor data may be processed locally. The processed data may be sent to an airframe mounted controller (e.g., BCU 402) via an analog signal or a digital signal.

In further embodiments, ASK 412 may be mounted to an airframe (e.g., airframe 50 of FIG. 1). In this regard, inertial sensor 320 may send sensor data to an airframe mounted controller (i.e., ASK 412) via an analog signal or a digital signal. The sensor data may be sent as processed data or as raw data. For example, raw sensor data may be sent to ASK 412 and ASK 412 may process the data to calculate linear acceleration ($\dot{V}_x$), linear velocity ($V_x$), linear acceleration ($\dot{V}_z$), and/or linear velocity ($V_z$).

In various embodiments, with reference to FIG. 5, the BCU 402 may include brake control executive (BKX) 414 and may include pressure control (PK) 416. In various embodiments, BKX 414 may comprise instructions stored in memory 405. In various embodiments, PK 416 may comprise instructions stored in memory 405.

In various embodiments, a pilot may control the brake using pilot controls to send a pilot desired pressure 420 to the BCU 402 that corresponds to a desired amount of braking. In this regard, the BCU 402 may receive pilot desired pressure 420. BKX 414 may receive pilot desired pressure 420.

In various embodiments, fixed deceleration command 442 may comprise a value such as, for example, 8.0 meters per second squared (m/s²) or any deceleration value suitable to a braking application as determined based on aircraft weight, speeds, and braking capability to provide adequate antiskid protection.

In various embodiments, ASK/DK 452 may receive filtered wheel speed 328 and filtered wheel acceleration 329. ASK 412 may receive sensor data 446 from inertial sensor 320. Sensor data 446 may comprise linear acceleration ($\dot{V}_x$). ASK 412 may calculate linear velocity ($V_x$) using linear acceleration ($\dot{V}_x$). ASK 412 may use linear velocity ($V_x$) to calculate wheel slip using the method described herein. In various embodiments, ASK 412 receives linear acceleration ($\dot{V}_x$) and calculates linear velocity ($V_x$) to determine wheel slip, and in various embodiments, ASK 412 receives linear velocity ($V_x$). In this regard, ASK 412 may calculate wheel slip speed $V_{slip}$, with momentary reference to FIG. 2. ASK/DK 452 may calculate ASK/DK desired pressure 444. In this regard, ASK 412 may be in electronic communication with BCU 402. ASK/DK 452 may output ASK/DK desired pressure 444 corresponding to a desired amount of pressure to be applied to a brake based on the filtered wheel speed 328, the filtered wheel acceleration 329 and wheel slip speed $V_{slip}$. ASK/DK 452 may send ASK/DK desired pressure 444 to BCU 402. Thus, BCU 402 may receive ASK/DK desired pressure 444. BKX 414 may receive ASK/DK desired pressure 444. In this regard, ASK/DK 452 may be in electronic communication with BCU 402. ASK/DK 452 may comprise instructions stored in memory 405.

In various embodiments, ASK/DK desired pressure 444 may take priority over pilot desired pressure 420. For example, in response to BCU 402 receiving both pilot desired pressure 420 and ASK/DK desired pressure 444 simultaneously, an internal switch logic may send ASK/DK desired pressure 444 to BKX 414. In this regard, ASK/DK desired pressure 444 may override pilot desired pressure 420.

In various embodiments, BKX 414 may receive a touchdown protection flag 432. Touchdown protection flag 432 may indicate to BKX 414 whether or not an aircraft is touching the ground. BKX 414 may receive a locked wheel flag 434. Locked wheel flags 434 may comprise a signal indicating to BKX 414 that wheel/axle arrangement 200 (see FIG. 2) is locked (not rotating) or skidding (wheel skid). For example, in response to a deceleration of the rotational velocity of wheel/axle arrangement 200, locked wheel flags 434 may instruct BKX 414 to prevent brakes 306 (see FIG. 4) from applying braking. The BKX 414 may issue a pressure command 424 based on ASK/DK desired pressure 444 or pilot desired pressure 420 or a zero pressure value requested by the locked wheel flags. The pressure command 424 corresponds to a desired amount of pressure to be applied to the brakes 306.

The PK 416 may receive the pressure command 424 and may convert the pressure command 424 into a current command 326. Current command 326 may be a current measured in Amperes such as, for example, a current from the range of 2 mA-30 mA. The current command 326 may be received by the brake control device 317 of the brake 306, with momentary reference to FIG. 4. Brake control device 317 may be designed to convert the current command 326 into a pressure. The pressure may be applied to one or more disks of a disk brake system of the brake 306. The relationship between received current of brake control device 317 and the amount of pressure applied may generally be linear.

In various embodiments, with combined reference to FIG. 4 and FIG. 5, the PK 416 may determine the current command 426 based on a detected pressure 332 corresponding to a detected pressure applied to the one or more disks of the brake 306. In that regard, the determination of the current command 326 may be based on a feedback system such that the current command 326 is adjusted in an attempt to equalize the measured pressure 332 and the pressure command 424 based on the aforementioned relationship. In various embodiments, pressure sensor 309 may transmit the measured pressure 332 to PK 416 for feedback control of brake control device 317.

Figure 6:
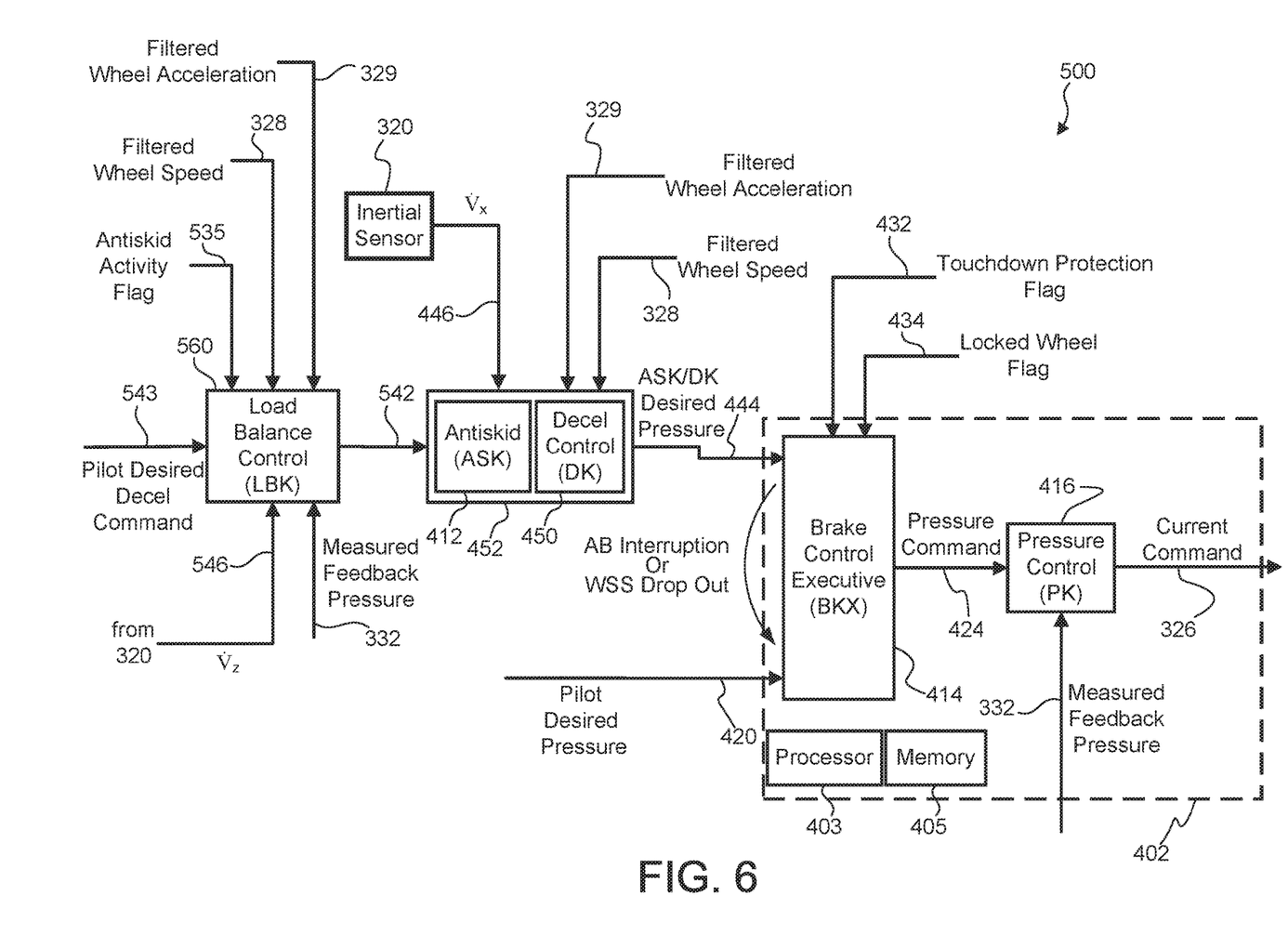
FIG. 6 illustrates a schematic view of a brake controls system having an inertial sensor in electronic communication with an ASK and a load balance control (LBK), in accordance with various embodiments.

With reference to FIG. 6, a system 500 for brake control is illustrated, in accordance with various embodiments. System 500 may be similar to system 400 of FIG. 5 except that system 500 additionally includes load balance control (LBK) 560. Load balance control 560 may determine a difference between the weight on a first set of wheels and the weight on a second set of wheels and adjust braking between said sets of wheels to provide proper braking to the wheels. In various embodiments, LBK 560 may adjust the rolling radius (e.g., drag radius $r_{drag}$ of FIG. 2) in response to a determined load on a wheel or set of wheels. For example, the rolling radius may change in response to a varying load on a wheel.

In various embodiments, LBK 560 may receive sensor data 546 from inertial sensor 320. Sensor data 546 may comprise linear acceleration ($\dot{V}_z$). LBK 560 may receive linear acceleration ($\dot{V}_z$) from inertial sensor 320. LBK 560 may calculate linear velocity ($V_z$) using linear acceleration ($\dot{V}_z$). LBK 560 may use linear velocity ($V_z$) to determine drag radius $r_{drag}$, with momentary reference to FIG. 2. In various embodiments, LBK 560 receives linear acceleration ($\dot{V}_z$) and calculates linear velocity ($V_z$) to determine drag radius $r_{drag}$, and in various embodiments, LBK 560 receives linear velocity ($V_z$) to determine drag radius $r_{drag}$.

In various embodiments, LBK 560 may receive filtered wheel speed 328 and filtered wheel acceleration 329. LBK 560 may receive antiskid activity flag 535. Antiskid activity flag may be similar to locked wheel flag 434.

LBK 560 may receive a pilot desired deceleration command 543. In various embodiments, a pilot may use a switch, dial, knob, button, or any other suitable means to select a pilot desired deceleration command 543. For example, pilot desired deceleration command 543 may comprise a value such as, for example, 1.8, 2.4, 3.0, or 5.0 meters per second squared (m/s²) or any deceleration value suitable to a braking application as determined based on aircraft weight, speeds, and braking capability. LBK 560 may use pilot desired deceleration command 543, filtered wheel speed 328, filtered wheel acceleration 329, antiskid activity flag 535, linear acceleration ($\dot{V}_z$), and/or linear velocity ($V_z$) to generate load balance deceleration command 542. Load balance deceleration command 542 may comprise pilot desired deceleration command 543 adjusted for load balance control. In various embodiments, ASK/DK desired pressure 444 may be generated using load balance deceleration command 542.

Load balance deceleration command 542 may comprise any suitable deceleration command adjusted for load balance control. In this regard, a first deceleration command 542 may be sent to left side set of wheels and a second deceleration command 542 may be sent to a right-side set of wheels, wherein the second deceleration command 542 comprises a different value from the first deceleration command 542. In this regard, by measuring a vertical acceleration of the axle, inertial sensor 320 allows for improved load balance control.

Figure 7:
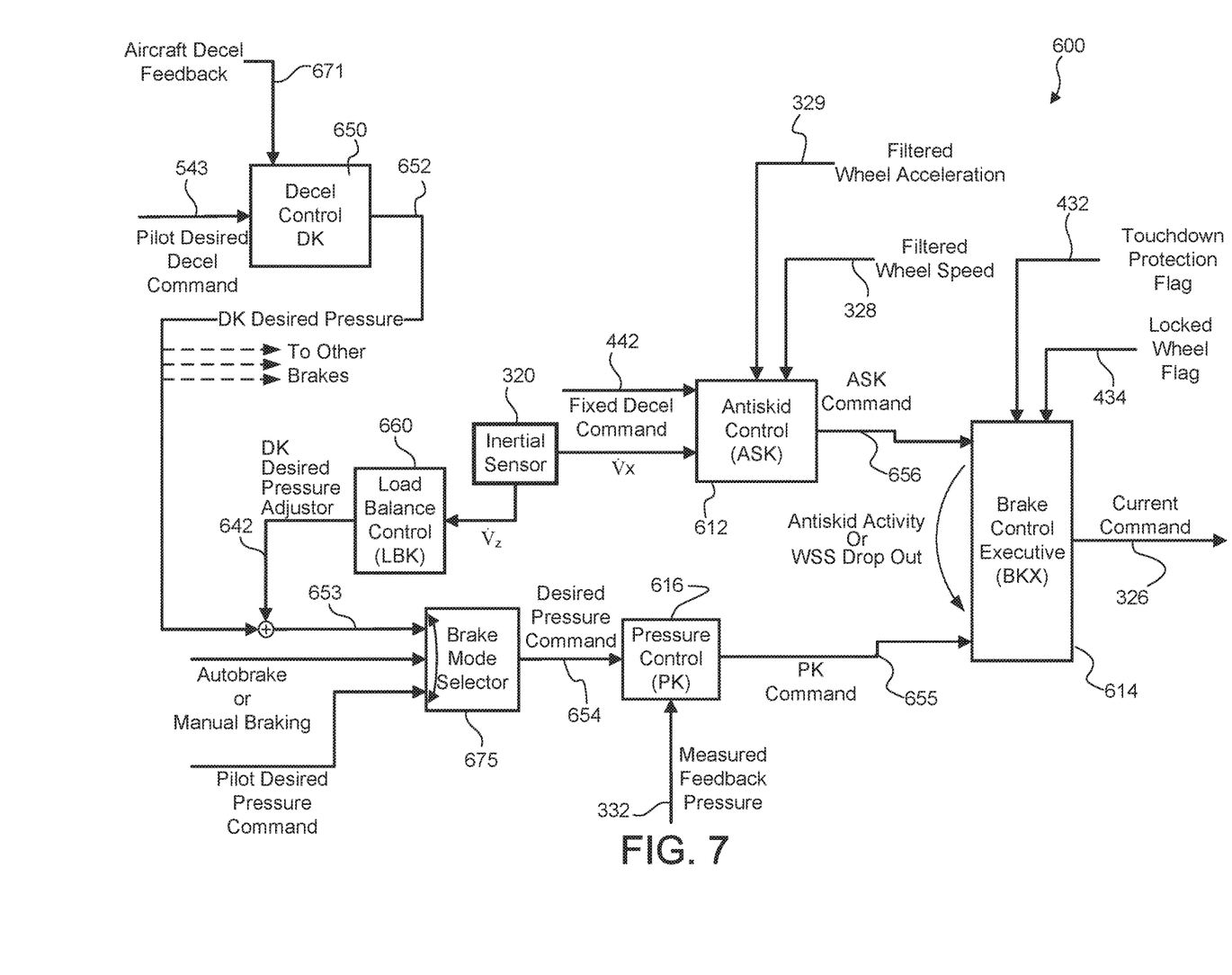
FIG. 7 illustrates a schematic view of a brake controls system having an inertial sensor in electronic communication with an ASK and an LBK, in accordance with various embodiments.

With reference to FIG. 7, a system 600 for brake control is illustrated, in accordance with various embodiments. In various embodiments, system 600 may be similar to system 500 of FIG. 6. FIG. 7 illustrates an exemplary brake control system architecture in which inertial sensor 320 may be used for improved brake control. With respect to FIG. 7, elements with like element numbering, as depicted in FIG. 4, FIG. 5, and FIG. 6, are intended to be the same and will not necessarily be repeated for the sake of clarity. Pilot desired deceleration command 543 may be received by DK 650. DK 650 may receive aircraft deceleration feedback 671. DK 650 may generate a DK desired pressure command 652. LBK 660 may receive linear acceleration ($\dot{V}_z$) and generate a desired pressure adjustor 642. Desired pressure adjustor 642 and DK desired pressure 652 may be added together to generate an adjusted pressure command 653 which may be received by brake mode selector 675. Brake mode selector 675 may send desired pressure command 654 to PK 616. Brake mode selector 675 may select between adjusted pressure command 653, a manual or autobrake command, and/or a pilot desired pressure command to output to PK 616. PK 616 may receive measured feedback pressure 332. PK 616 may generate a PK command 655. BKX 614 may receive PK command 655. BKX 614 may receive ASK command 656. ASK 612 may receive a fixed deceleration command 442, linear velocity ($V_x$), linear acceleration ($\dot{V}_x$), filtered wheel acceleration 329, and/or filtered wheel speed 328. ASK 612 may use linear velocity ($V_x$) to calculate wheel slip, using the methods as described herein. ASK command 656 may be adjusted based on the calculated wheel slip. BKX 614 may receive touchdown protection flag 432 and locked wheel flag 434. BKX may output current command 326.

Figure 8:
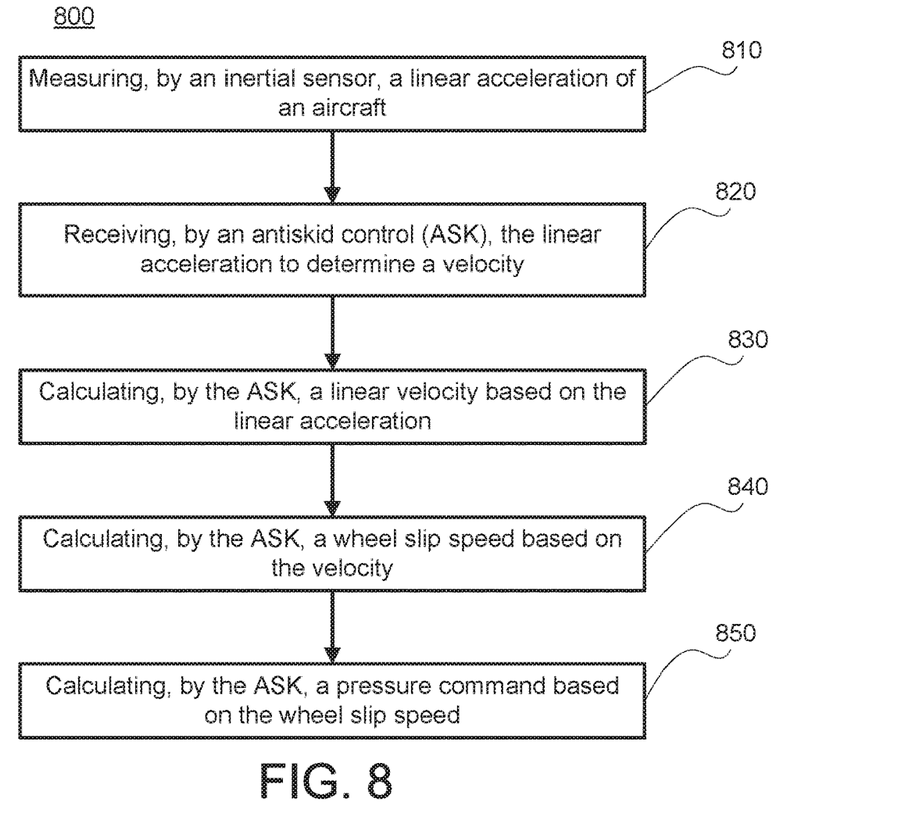
FIG. 8 and FIG. 9 illustrate methods for controlling brakes, in accordance with various embodiments.

With reference to FIG. 8, a method 800 for controlling brakes is provided, in accordance with various embodiments. Method 800 includes measuring, by an inertial sensor, a linear acceleration of an aircraft (step 810). Method 800 includes receiving, by an ASK, the linear acceleration (step 820). Method 800 includes calculating, by the ASK, a linear velocity based on the linear acceleration (step 830). Method 800 includes calculating, by the ASK, a wheel slip based on the linear velocity (step 840). Method 800 includes calculating, by the ASK, a pressure command based on the wheel slip (step 850).

With combined reference to FIG. 4, FIG. 5, and FIG. 8, a step 810 may include measuring, by inertial sensor 320, linear acceleration ($\dot{V}_x$) of aircraft 10 (see FIG. 1). Step 820 may include receiving, by ASK 412, linear acceleration ($\dot{V}_x$) from inertial sensor 320. Step 830 may include calculating, by ASK 412, linear velocity ($V_x$) using linear acceleration ($\dot{V}_x$). Step 840 may include calculating, by ASK 412, wheel slip as defined by equation 1 herein. Step 840 may include calculating, by ASK 412, wheel slip speed $V_{slip}$. Step 850 may include calculating, by ASK 412, a pressure command such as ASK/DK desired pressure 444 or ASK command 656 for example.

Figure 9:
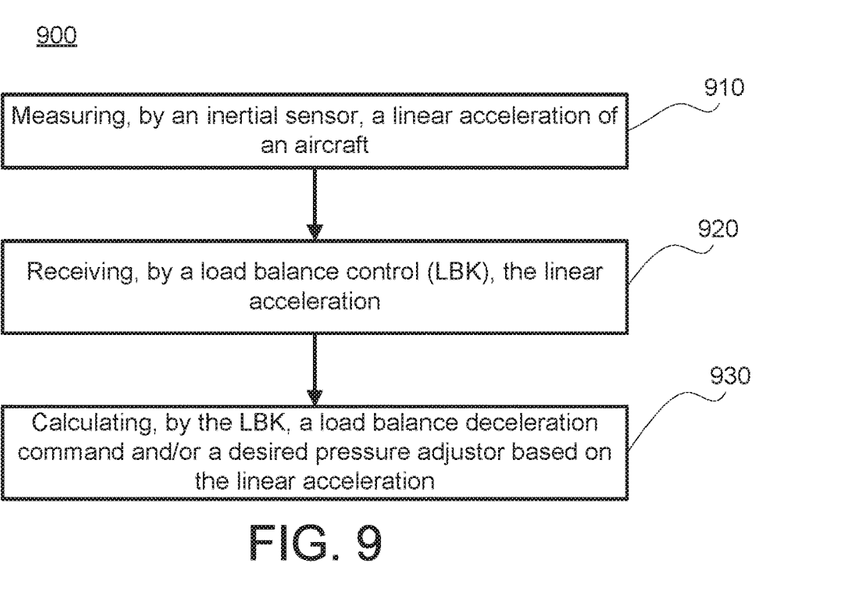

With reference to FIG. 9, a method 900 for controlling brakes is provided, in accordance with various embodiments. Method 900 includes measuring, by an inertial sensor, a linear acceleration of an aircraft (step 910). Method 900 includes receiving, by a LBK, the linear acceleration (step 920). Method 900 includes calculating, by the LBK, a load balance deceleration command and/or a desired pressure adjustor based on the linear acceleration (step 930).

With combined reference to FIG. 6 and FIG. 9, step 910 may include measuring, by inertial sensor 320, linear acceleration ($\dot{V}_z$) of aircraft 10 (see FIG. 1). Step 920 may include receiving, by LBK 560, linear acceleration ($\dot{V}_z$) from inertial sensor 320. Step 930 may include calculating, by LBK 560, load balance deceleration command 542 and/or desired pressure adjustor 642.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A brake control system, comprising:
an inertial sensor coupled to an axle and configured to measure a linear acceleration of the axle; and
an antiskid control (ASK) in electronic communication with the inertial sensor, wherein at least one of the inertial sensor or the ASK calculate a linear velocity of the axle based on the linear acceleration, and the ASK uses the linear velocity to calculate a wheel slip speed.

2. The brake control system of claim 1, wherein the inertial sensor measures the linear acceleration of the axle in a forward direction.

3. The brake control system of claim 1, wherein the inertial sensor comprises at least one of an accelerometer, a magnetometer, and a gyroscope.

4. The brake control system of claim 3, wherein the inertial sensor comprises a microelectromechanical system (MEMS).

5. The brake control system of claim 1, further comprising a wheel speed sensor configured to measure a rotational velocity of the axle.

6. The brake control system of claim 5, wherein the rotational velocity and the linear velocity are used to calculate the wheel slip speed.

7. The brake control system of claim 6, wherein the ASK calculates the wheel slip speed using equation $V_{slip} = V_{ac} - r_{drag} \cdot \omega$, where $V_{ac}$ equals the linear velocity, $\omega$ equals the rotational velocity, and $r_{drag}$ equals a distance between an axis of rotation of the axle and a ground surface.

8. The brake control system of claim 1, wherein the ASK comprises a controller and instructions stored in a memory configured to be executed by the controller, the ASK being mounted to the axle, the ASK configured to send the wheel slip speed to an airframe mounted controller via at least one of an analog signal or a digital signal.

9. The brake control system of claim 1, wherein the ASK comprises a controller and instructions stored in a memory configured to be executed by the controller, the ASK being mounted to an airframe, the inertial sensor configured to send at least one of a raw signal or a processed signal to the ASK via at least one of an analog signal or a digital signal.

10. The brake control system of claim 1, further comprising a load balance control (LBK).

11. The brake control system of claim 10, wherein the inertial sensor is configured to measure an additional linear acceleration of the axle, the additional linear acceleration measured in a vertical direction.

12. The brake control system of claim 11, wherein the LBK calculates a load balance deceleration command using the additional linear acceleration.

13. A method for controlling brakes, comprising:
measuring, by an inertial sensor, a linear acceleration of an aircraft;
receiving, by an antiskid control (ASK), the linear acceleration;
calculating, by the ASK, an aircraft speed based on the linear acceleration;
calculating, by the ASK, a wheel slip speed using the aircraft speed based on the linear acceleration; and
calculating, by the ASK, a pressure command based on the wheel slip speed.

14. The method of claim 13, further comprising:
receiving, by a brake control unit (BCU), the pressure command from the ASK; and
sending, by the BCU, a current to a brake control device.

15. The method of claim 13, wherein the aircraft speed is measured in a forward direction.

16. A method for controlling brakes, comprising:
measuring, by an inertial sensor, a linear acceleration of an aircraft in a vertical direction;
receiving, by a load balance control (LBK), the linear acceleration;
calculating, by the LBK, a drag radius using the linear acceleration; and
calculating, by the LBK, at least one of a load balance deceleration command and a desired pressure adjustor using the linear acceleration.

17. The method of claim 16, further comprising receiving, by an antiskid control (ASK), the load balance deceleration command.

18. The method of claim 17, further comprising:
receiving, by a brake control unit (BCU), a pressure command from the ASK, the pressure command generated using the load balance deceleration command; and
sending, by the BCU, a current to a brake control device.

* * * * *